United States Patent
Soriaga et al.

(10) Patent No.: US 9,794,944 B2
(45) Date of Patent: Oct. 17, 2017

(54) SYSTEM AND METHOD FOR MOBILITY TRACKING OF USER EQUIPMENT

(71) Applicant: QUALCOMM Incorporated, San Diego, CA (US)

(72) Inventors: Joseph Binamira Soriaga, San Diego, CA (US); Tingfang Ji, San Diego, CA (US); Peter Pui Lok Ang, San Diego, CA (US); Naga Bhushan, San Diego, CA (US); Keiichi Kubota, Farnborough (GB); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/946,374

(22) Filed: Nov. 19, 2015

(65) Prior Publication Data
US 2016/0270082 A1 Sep. 15, 2016

Related U.S. Application Data

(60) Provisional application No. 62/133,219, filed on Mar. 13, 2015.

(51) Int. Cl.
*H04W 72/00* (2009.01)
*H04W 72/04* (2009.01)
(Continued)

(52) U.S. Cl.
CPC ....... *H04W 72/0486* (2013.01); *H04L 5/0053* (2013.01); *H04W 4/025* (2013.01);
(Continued)

(58) Field of Classification Search
CPC ..... H04W 60/00; H04W 72/00; H04W 88/08; H04W 88/18; H04M 1/72519
(Continued)

(56) References Cited

U.S. PATENT DOCUMENTS 6,714,789 B1 3/2004 Oh et al.
7,693,527 B2 4/2010 Krstulich
(Continued)

FOREIGN PATENT DOCUMENTS

WO 2014139588 A1 9/2014

OTHER PUBLICATIONS

International Search Report—PCT/US2016/018506—ISA/EPO—dated Jul. 15, 2016.
(Continued)

*Primary Examiner* — Steve D Agosta
(74) *Attorney, Agent, or Firm* — Haynes and Boone, LLP

(57) ABSTRACT

A system and method for mobility tracking of user equipment in a network includes a user equipment. The user equipment includes an antenna for receiving and sending signals to a plurality of network nodes in a network and a processor coupled to the antenna. The processor is configured to broadcast, using the antenna, a pilot signal to advertise the user equipment, receive, using the antenna, a pilot response from a first network node acting as a serving node for the user equipment, and communicate with the network through the serving node. The pilot signal includes a reference sequence for the network nodes to track followed by a payload including information about an identity of the user equipment. In some embodiments, the reference sequence varies based on a state of the user equipment. In some embodiments, the reference sequence is randomly selected.

47 Claims, 4 Drawing Sheets

(51) Int. Cl.
*H04W 76/04* (2009.01)
*H04W 4/06* (2009.01)
*H04W 4/02* (2009.01)
*H04L 5/00* (2006.01)

(52) U.S. Cl.
CPC ........... *H04W 4/06* (2013.01); *H04W 72/042* (2013.01); *H04W 76/046* (2013.01)

(58) Field of Classification Search
USPC ......... 455/435.2, 450, 507, 550.1, 560, 561; 370/310.2, 312, 328, 338
See application file for complete search history.

(56) References Cited

U.S. PATENT DOCUMENTS

| | | | |
|---|---|---|---|
| 8,792,423 B2* | 7/2014 | Lu | .................... H04W 52/0254 370/328 |
| 9,479,304 B2* | 10/2016 | Kim | ..................... H04L 5/0048 |
| 2011/0053594 A1 | 3/2011 | Lim et al. | |
| 2013/0163532 A1 | 6/2013 | Anderson et al. | |
| 2013/0286958 A1 | 10/2013 | Liang et al. | |
| 2015/0072705 A1 | 3/2015 | Zhang | |
| 2015/0138977 A1 | 5/2015 | Dacosta | |
| 2016/0128006 A1* | 5/2016 | Ji | ......................... H04W 48/14 370/350 |

OTHER PUBLICATIONS

Written Opinion—PCT/US2016/018506—ISA/EPO—dated Jul. 15, 2016.
Partial International Search Report for PCT/US2016/018506—ISA/EPO—dated Apr. 26, 2016.

* cited by examiner

SYSTEM AND METHOD FOR MOBILITY TRACKING OF USER EQUIPMENT

RELATED APPLICATIONS

The present application claims priority to U.S. Provisional Patent Application No. 62/133,219, entitled "System and Method for Mobility Tracking of User Equipment," which was filed Mar. 13, 2015, which is hereby incorporated by reference in its entirety.

TECHNICAL FIELD

The present disclosure relates generally to communication methods for cellular networks, and more particularly to mobility tracking of user equipment.

BACKGROUND

Many of today's communication systems, such as third generation (3G), fourth generation (4G), and fifth generation (5G) mobile networks provide services to mobile devices or user equipment (UE) using a cellular or mobile network with a plurality of geographically distributed base stations or nodes. As a user equipment moves in and around the nodes, it becomes important to track the location of the user equipment and determine which of the nodes will act as the serving node for the user equipment. Traditional approaches have relied on the user equipment to take the primary responsibility for determining where the user equipment is topologically located in the network and to help select the serving node. These approaches typically placed an expensive computational burden on the user equipment and often required the user equipment to exchange multiple messages with multiple nearby nodes before selecting the serving node. These exchanges often placed a significant burden on the power budget for the user equipment as well as the bandwidth of the network. In addition, the user equipment's choice of serving node may occur at the expense of overall network capability and/or efficiency.

Accordingly, it would be desirable to provide systems and methods for improving the tracking of user equipment in a mobile network and the selection of a serving node for each user equipment.

SUMMARY

According to some embodiments a user equipment includes an antenna for receiving and sending signals to a plurality of network nodes in a network and a processor coupled to the antenna. The processor is configured to broadcast, using the antenna, a pilot signal to advertise the user equipment, receive, using the antenna, a pilot response from a first network node acting as a serving node for the user equipment, and communicate with the network through the serving node. The pilot signal includes a reference sequence for the network nodes to track followed by a payload including information about an identity of the user equipment.

According to some embodiments, a network node for coupling a plurality of user equipment to a network includes an antenna for receiving and sending signals to the plurality of user equipment and a processor coupled to the antenna. The processor is configured to receive, using the antenna, a pilot signal from a first user equipment, exchange information about the pilot signal with the other network nodes, elect or not elect the network node as a serving node for the first user equipment based on the exchanged information about the pilot signal, and transmit, using the antenna, a pilot response to the first user equipment when the network node is elected as the serving node for the first user equipment. The pilot signal includes a reference sequence for the network node and the other network nodes to track followed by a payload including information about an identity of the first user equipment.

According to some embodiments, a zone controller for a zone of a network includes a processor. The processor is configured to receive information about a pilot signal received by a plurality of network nodes from a user equipment, select a first network node from the plurality of network nodes as a serving node for the user equipment based on the received information about the pilot signal, and cause transmission of a notification to the first network node that the first network node is the serving node for the user equipment. The pilot signal includes a reference sequence for the plurality of network nodes to track followed by a payload including information about an identity of the user equipment.

According to some embodiments, a semiconductor device includes a non-transitory memory and one or more processors coupled to the non-transitory memory and configured to read instructions from the non-transitory memory to cause the device to perform operations. The operations include broadcasting, using an antenna of a user equipment, a pilot signal to advertise the user equipment to a plurality of network nodes of a network, receiving, using the antenna, a pilot response from a first network node acting as a serving node for the user equipment, and sending and receiving messages through the antenna to the serving node. The pilot signal includes a reference sequence for the plurality of network nodes to track followed by a payload including information about an identity of the user equipment.

According to some embodiments, a method includes broadcasting, using an antenna, a pilot signal to advertise a user equipment to a plurality of network nodes in a network, receiving, using the antenna, a pilot response from a first network node acting as a serving node for the user equipment, and communicating with the network through the serving node. The pilot signal includes a reference sequence for the plurality of network nodes to track followed by a payload including information about an identity of the user equipment.

According to some embodiments, a user equipment includes means for broadcasting a pilot signal to advertise the user equipment to a plurality of network nodes in a network, means for receiving a pilot response from a first network node acting as a serving node for the user equipment, and means for communicating with the network through the serving node. The pilot signal includes a reference sequence for the plurality of network nodes to track followed by a payload including information about an identity of the user equipment.

According to some embodiments, a method includes receiving, using an antenna at a network node, a pilot signal from a user equipment, exchanging information about the pilot signal with other network nodes coupled to the network node, electing or not electing the network node as a serving node for the first user equipment based on the exchanged information about the pilot signal, and transmitting, using the antenna, a pilot response to the first user equipment when the network node is elected as the serving node for the first user equipment. The pilot signal includes a reference sequence for the network node and the other network nodes to track followed by a payload including information about an identity of the first user equipment.

According to some embodiments, a network node includes means for receiving a pilot signal from a user equipment, means for exchanging information about the pilot signal with other network nodes coupled to the network node, means for electing or not electing the network node as a serving node for the first user equipment based on the exchanged information about the pilot signal, and means for transmitting a pilot response to the user equipment when the network node is elected as the serving node for the user equipment. The pilot signal includes a reference sequence for the network node and the other network nodes to track followed by a payload including information about an identity of the user equipment.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In a traditional mobile network, the selection of a serving node for each user equipment is typically based on tracking, by the user equipment, of the user equipment's location in the mobile network. This typically involves the user equipment exchanging tracking messages with one or more nearby base stations or nodes to determine which nodes are nearby and the capabilities of the each of the nearby nodes. Based on the information provided to the user equipment in the tracking messages, the user equipment determines which of the nodes should act as its serving node. This places a not insignificant computational burden on the user equipment as it requests and receives the tracking messages and makes the selection of the serving node. This also consumes both power and bandwidth resources for the user equipment that could be better used for other services and/or features. In addition, the user equipment's selection of the serving node may not be the best selection for the mobile network as a whole. In some examples, relying on the user equipment to select the serving node may also complicate the handoff of the user equipment between two serving nodes.

Figure 1:
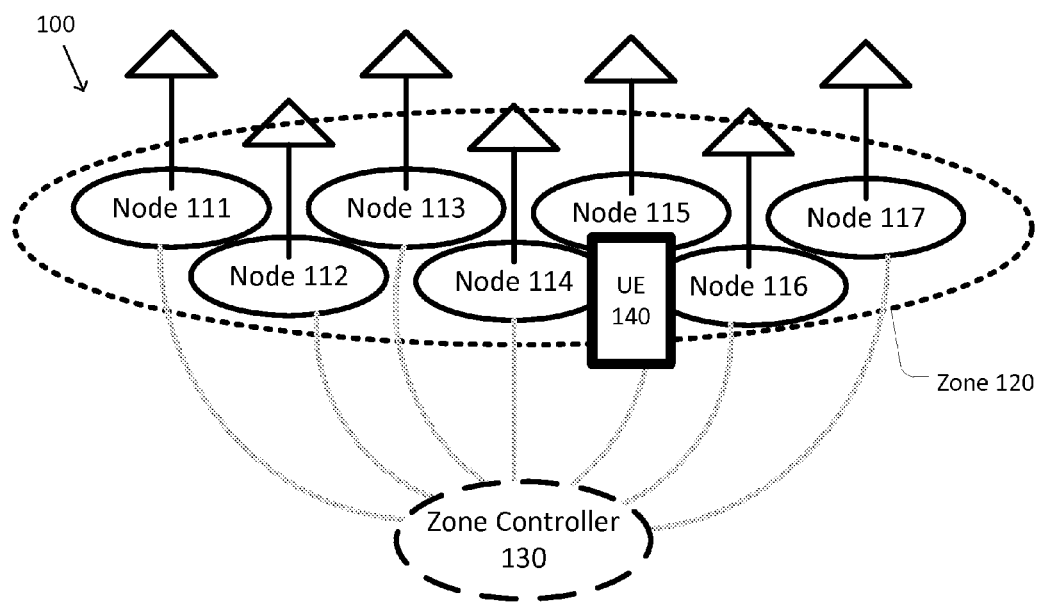
FIG. 1 is a simplified diagram of a mobile network according to some embodiments.

FIG. 1 is a simplified diagram of a mobile network 100 according to some embodiments. As shown in FIG. 1, mobile network 100 includes a plurality of base stations or nodes 111-117. And although only seven nodes 111-117 are shown in mobile network 100, one of ordinary skill would understand that mobile network 100 may include any number of nodes including fewer than seven or more than seven nodes. Each of the nodes 111-117 provides mobile and/or cellular (both voice and/or data) services to user equipment located within geographic and/or communication range of the respective node 111-117. Although not shown in FIG. 1, the geographic and/or communication range of the nodes 111-117 typically overlap to avoid gaps in coverage, redundancy, more flexible handoffs, and/or the like. In other words, each user equipment located within mobile network 100 may be able, at any time, to communicate with more than one of the nodes 111-117. In some examples, each of the nodes 111-117 may be associated with a cellular tower, pico cell, femto cell, remote radio head, and/or the like.

In some embodiments, the nodes 111-117 of mobile network 100 are organized in a zone 120. In some examples, zones, such as zone 120, may be used to manage a plurality of nodes as a sub-unit of a larger network. In some examples, zone 120 may correspond to a service region for a mobile services provider, a metropolitan area, and/or the like. According to some embodiments, mobile network 100 may optionally include a zone controller 130, and in some examples, each of the nodes 111-117 of zone 120 may be managed by the zone controller 130. Zone controller 130 has responsibility for coordinating the services provided by the nodes 111-117 in zone 120. In some examples, this may include coordinating services to better manage bandwidth, load balancing, serving node hand off, and/or the like. As shown in FIG. 1, zone controller 130 is coupled to each of the nodes 111-117 via one or more network links and/or network connections. In some examples, the one or more network links and/or network connections may include wireless and/or wired links and/or one or more network switching devices and/or routers (not shown). And although zone controller 130 is shown as a separate device, zone controller 130 may be operated in a distributed fashion among the nodes 111-117 with the nodes 111-117 exchanging management messages among themselves to provide the desired management capabilities for zone 120.

Mobile network 100 is also depicted with a user equipment 140, that may be representative of any of the user equipment using mobile network 100 for services. In some examples, user equipment 140 may be a cellular phone, a smart phone, a tablet, a computer with an air card, a mobile access point, and/or the like. In typical operation, most of the communications between user equipment 140 and the nodes 111-117 of mobile network 100 are handled by a single one of the nodes 111-117 designated as the serving node for user equipment 140. In some examples, the serving node is selected from among the nodes 111-117 based on one or more factors including geographic location, signal strength, load balancing, and/or the like.

As a first step in determining the serving node for user equipment 140, user equipment 140 advertises its presence to mobile network 100 and zone 120 by transmitting one or more pilot signals. Depending upon the particular approach, one or more of the nodes 111-117 in zone 120 listen for the one or more pilot signals transmitted by user equipment 140. Each of the nodes 111-117 that is able to receive and decode the one or more pilot signals becomes a node in an active set of possible serving nodes for user equipment 140. In a possible example from FIG. 1, the one or more pilot signals transmitted by user equipment 140 may be received by nodes 114, 115, and 116 due to their closer proximity to user equipment 140. To help the nodes 111-117 distinguish between pilot signals from different user equipment, the payload of each pilot signal includes an identifier that is, at least, locally unique to the user equipment as is discussed in further detail below. After the nodes 111-117 receive the pilot signal from user equipment 140, a serving node for user equipment 140 is selected. The approach for selecting the serving node varies depending upon whether the nodes 111-117 are selecting the serving node in a distributed fashion of whether zone controller 130 is selecting the serving node.

In some examples, where the serving node is selected in a distributed fashion, each of the nodes 111-117 in the active set exchanges one or more messages with others of the nodes 111-117 in the active set to indicate that a pilot signal with a corresponding reference sequence and/or user equipment identifier has been received. In some examples, the one or more messages may include additional information from the payload of the pilot signal and/or information about the pilot signal of the respective node. In some examples, the payload may include information reported by user equipment 140, such as a channel state, a transmit buffer state, signal strengths of one or signals previously received from nodes 111-117, location information, and/or the like. In some examples, the information about the pilot signal may include a signal strength of the pilot signal as received by the respective node 111-117. In some examples, the information about the respective node may include an identifier for the respective node, such as an IP or MAC address and/or a network assigned node ID, a respective processing load of the respective node, a respective bandwidth utilization for the respective node, and/or the like. Each of the nodes 111-117 in the active set then applies a common set of rules to determine which of the nodes 111-117 in the active set should be selected as the serving node.

In some examples, the rules may include a rule to select the serving node based on the node that received the pilot signal with the highest signal strength. In some examples, the rules may include a rule to select the serving node based on the node with a lowest processing load, bandwidth utilization, and/or the like. In some examples, the rules may include a rule to select the serving node based on the node that is geographically closest to the user equipment. In some examples, the rules may include a rule to exclude as the serving node any node that received the pilot signal with a signal strength below a threshold signal strength level. In some examples, the rules may include a rule to select the serving node based on the node that is geographically closest to the user equipment. In some examples, composite rules combining one or more other rules may be used. In some examples, the rules may include one or more tie-breaking rules that select as the serving node the node with the highest or lowest identifier.

In some examples, where the serving node is selected by zone controller 130, each of the nodes 111-117 in the active set transmit one or more messages to zone controller 130 to indicate that a pilot signal with a corresponding reference sequence and/or user equipment identifier has been received. In some examples, the one or more messages may, similar to the distributed selection case, include additional information from the payload of the pilot signal and/or information about the pilot signal of the respective node. Once zone controller 130 receives the messages, zone controller 130 may apply one or more rules similar to the rules discussed above to select the serving node. In some examples, zone controller 130 may apply a more sophisticated tie-breaking rule, such as a round robin selection of the serving node from among the nodes that are otherwise tied. After zone controller 130 selects the serving node, it notifies at least the serving node by transmitting one or more messages to the selected serving node.

Once the serving node is selected, the serving node responds to the one or more pilot signals transmitted by user equipment 140 by transmitting a pilot response to user equipment 140. The pilot response notifies user equipment 140 which of the nodes 111-117 is the serving node. In some examples, the pilot response may be transmitted to user equipment 140 based on information conveyed in the pilot signal. Once the serving node is selected and communicated, user equipment 140 may use the serving node to communicate with and/or access additional services of mobile network 100.

According to some embodiments, the serving node selection process used by mobile network 100 may have one or more advantages over more traditional approaches that rely more heavily on the user equipment to discover the nodes in the active set of nodes and the selection of the serving node. In some examples, the use of the pilot signals and serving node selection, either in distributed fashion or by zone controller 130, reduces the amount of messaging and bandwidth used between user equipment 140 and mobile network 100 during the serving node selection process. In some examples, user equipment 140 is subjected to a lower computational burden and/or uses less power to perform serving node selection. In some examples, the serving node for user equipment 140 may be selected without the nodes 111-117 having to broadcast and/or share their node IDs with user equipment 140. In some examples, the selection of the serving node for user equipment 140 may be more optimal for mobile network 100 because the distributed selection process and/or the process used by zone controller 130 may be able to better select serving nodes for the numerous user equipment in mobile network 100 to account for load balancing of processing load, bandwidth, and/or the like and/or to account for other network and/or zone-wide concerns.

Figure 2:
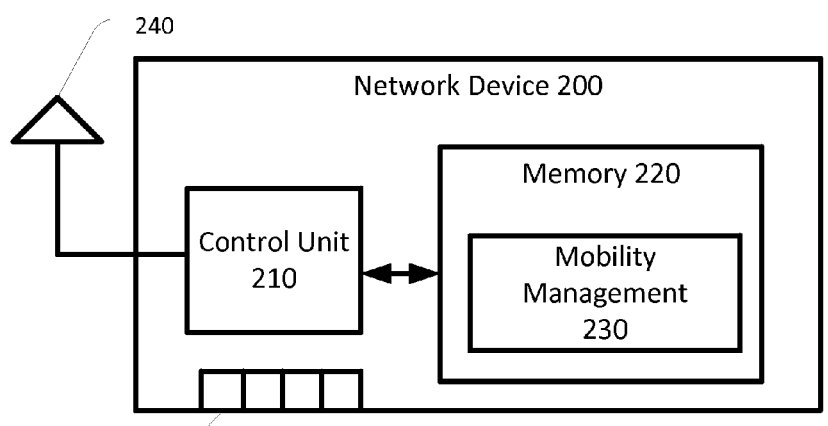
FIG. 2 is a simplified diagram of a network device according to some embodiments.

FIG. 2 is a simplified diagram of a network device 200 according to some embodiments. In some embodiments, network device 200 may be representative of any of the nodes 111-117, zone controller 130, and/or user equipment 140. As shown in FIG. 2, network device 200 includes a control unit 210 coupled to memory 220. Operation of network device 200 is controlled by control unit 210. Control unit 210 may include one or more central processing units, multi-core processors, microprocessors, microcontrollers, digital signal processors, field programmable gate arrays (FPGAs), application specific integrated circuits (ASICs), and/or the like.

Memory 220 may be used to store software executed by control unit 210 and/or one or more data structures used during operation of control unit 210. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, and/or any other medium from which a processor or computer is adapted to read.

As shown, memory 220 includes a mobility management application 230 that may be used to support the serving node selection process for user equipment 140 and mobile network 100. Mobility management application 230 may include one or more application programming interfaces (APIs) for receiving and/or transmitting pilot signals, receiving and/or transmitting pilot responses, and/or selecting a serving node for a user equipment depending on whether mobility management application 230 is located on a user equipment, a node, and/or a zone controller. And although mobility management application 230 is depicted as a software application, mobility management application 230 may be implemented using hardware, software, and/or a combination of hardware and software.

In embodiments where network device 200 is representative of user equipment 140 and/or any of the nodes 111-117, network device 200 may further include an antenna 240 for transmitting or receiving the pilot signals, the pilot responses, and/or other management and/or data messages typically exchanged between user equipment and nodes.

In some embodiments where network device 200 is representative of any of the nodes 111-117 and/or zone controller 130, network device 200 may further include one or more ports for transmitting and receiving messages between others of the nodes 111-117 and/or zone controller 130. In some examples, the messages may correspond to the messages exchanged by nodes 111-117 in the active set used for the distributed serving node selection process and/or the messages transmitted by the nodes 111-117 in the active set to report reception of a pilot signal to zone controller 130 and by zone controller 130 to notify the serving node that the serving node has been selected.

As discussed above and further emphasized here, FIG. 2 is merely an example which should not unduly limit the scope of the claims. One of ordinary skill in the art would recognize many variations, alternatives, and modifications. According to some embodiments, control unit 210 and memory 220 may be combined in a single semiconductor device, such as an ASIC, chip, package, and/or the like.

Figure 3:
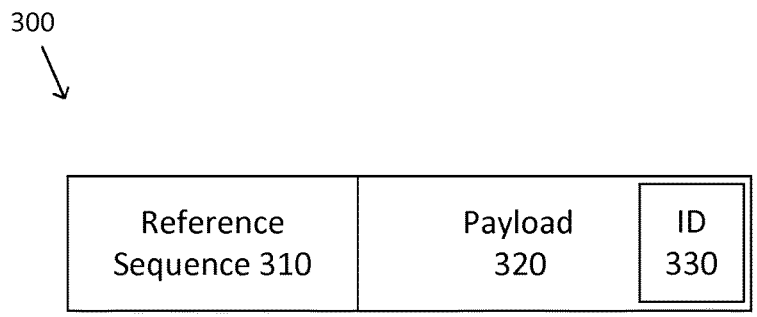
FIG. 3 is a simplified diagram of a pilot signal according to some embodiments.

FIG. 3 is a simplified diagram of a pilot signal 300 according to some embodiments. In some embodiments, pilot signal 300 may be representative of the one or more pilot signals described in the context of FIG. 1. As shown in FIG. 3, pilot signal 300 includes a reference sequence 310 and a payload 320. Depending upon a type of multiplexing used by a mobile network, pilot signal 300 may be multiplexed using any type of frequency and/or time division multiplexing. In some examples, different pilot signals from the same user equipment may be transmitted non-orthogonally (i.e., may reuse the same frequency and/or time slot as other pilot signals). In some examples, pilot signals from different user equipment may be sent orthogonally and/or non-orthogonally depending upon whether a collision-free approach is desired.

In some examples, reference sequence 310 may include a transmission and/or signaling pattern to support recognition of pilot signal 300, to support searching and/or channel estimation for pilot signal 300, recommendations and/or suggestions for signaling to use for a pilot response, and/or the like. In some examples, payload 320 may include an identifier (ID) 330 for the user equipment and/or other information. In some examples, the reference sequence 310 and/or the content of payload 320 may vary depending upon an operating state of the user equipment. In some examples, payload 320 may include information regarding a channel state measured from a last transmission sent by the network to the user equipment and/or a transmit buffer state of the user equipment.

Figure 4:
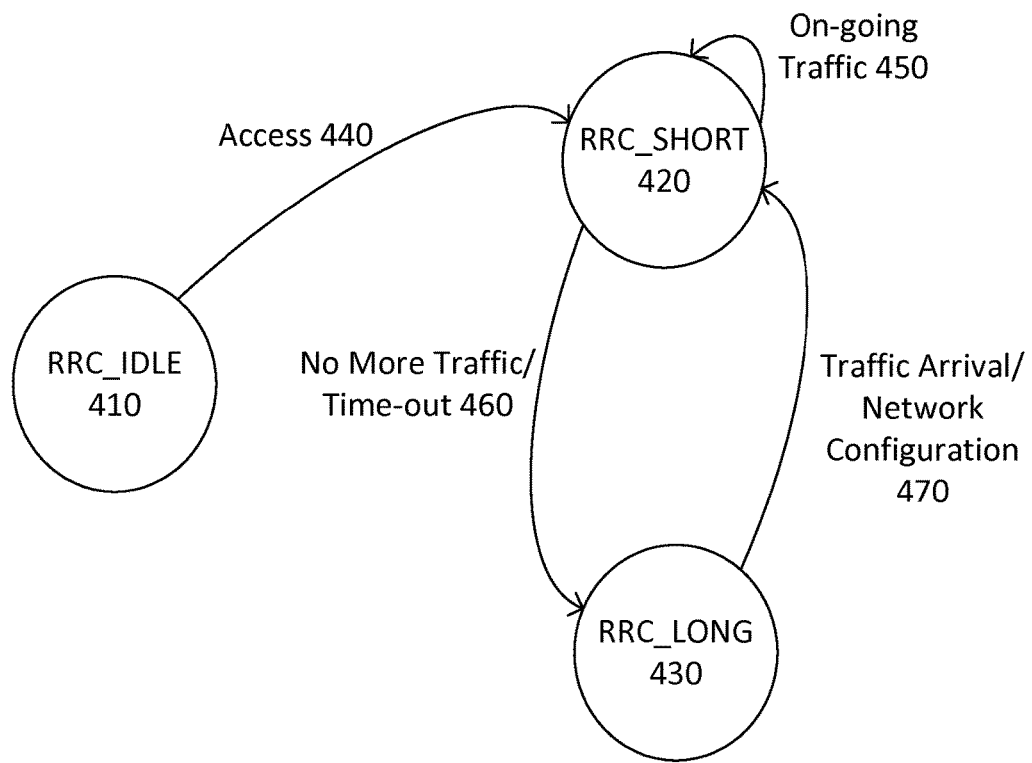
FIG. 4 is a simplified state diagram of a user equipment according to some embodiments.

FIG. 4 is a simplified state diagram 400 of a user equipment according to some embodiments. As shown in FIG. 4, a user equipment, such as user equipment 140, may be generally operated in one of three states: a RRC_IDLE state 410, a RRC_SHORT state 420, and/or a RRC_LONG state 430 depending upon a previous level and/or type of user equipment communication with a mobile network.

In some examples, the RRC_IDLE state 410 corresponds to situations where a user equipment has recently been powered up, rebooted, and/or moved into a service area of the mobile network. In some examples, the RRC_IDLE state 410 may indicate that more formal connection between the user equipment and the mobile network has not been established and/or authentication of the user equipment with the mobile network has not yet occurred. While in the RRC_IDLE state 410, the user equipment may optionally use one or more different types of pilot signals to advertise itself to the network. In some examples, a system information block (SIB) request may be used as the pilot signal. The user equipment typically makes the SIB request very rarely (e.g., twice daily) to request the system information used to begin a registration procedure. The SIB request does not include a user equipment identifier in the payload, uses a reserved reference sequence, and is transmitted using a reserved resource allocation, such as in a special synchronization subframe. In some examples, a connection set-up pilot signal may be used in the RRC_IDLE state 410. The user equipment typically uses the connection set-up pilot signal to request a connection to the mobile network after a reboot or power-up and before the user equipment has received and/or been assigned an identifier by the mobile network. In some examples, the user equipment identifier in the payload of the connection set-up pilot signal may be a random identifier chosen by the user equipment or a globally unique temporary identifier (GUTI). As depicted by a state transition 440, the user equipment may transition from RRC_IDLE state 410 to RRC_SHORT state 420 once the user equipment has been granted more formal access to the mobile network.

In some examples, the RRC_SHORT state 420 may correspond to when continuous and/or near continuous exchange of traffic and/or data between the user equipment and its serving node is occurring. In RRC_SHORT state 420 handshaking, keep alive, management exchanges, and/or the like between the user equipment and its service node occur at more rapid intervals, such as every 10 to 100 ms. While in the RRC_SHORT state 420, the user equipment may optionally use a SIB request as the pilot signal or use an active set tracking pilot signal. The payload of the active set tracking pilot signal includes a zone- or cluster-assigned random network temporary identifier (RNTI) that in some examples is 16 bits in length. In some examples, the payload of the active set tracking pilot signal may further include a channel quality indicator (CQI), a status report (SR), and/or a buffer status report (BSR) to report channel states, transmit buffer states, and/or the like. In some examples, the reference sequence and the resource allocation are assigned to the user equipment by the network to provide for faster periodicity and/or to provide more seamless mobility when the user equipment is handed off between serving nodes. The user equipment remains in RRC_SHORT state 420 as long as timely ongoing communication traffic occurs between the user equipment and the serving node as depicted by a state transition 450. When active traffic, such as active data transfers, ceases and/or a time out occurs without suitable traffic, active data transfer, and/or message exchange, the user equipment transitions to RRC_LONG state 430 as shown by a state transition 460.

In some examples, in the RRC_LONG state 430, handshaking, keep alive, management exchanges, and/or the like between the user equipment and the serving node may occur at less frequent intervals, such as 1 second or up to several minutes. While in the RRC_LONG state 430, the user equipment may optionally use a SIB request as the pilot signal, use a mobility tracking pilot signal, or use an on-demand pilot signal. The payload of the mobility tracking pilot signal and/or the on-demand pilot signal includes a zone- or cluster-assigned RNTI that in some examples is 40 bits in length. In some examples, the payload of the on-demand pilot signal may further include a SR and/or a BSR to report channel states, transmit buffer states, and/or the like. In some examples, the reference sequence and the resource allocation for the mobility tracking pilot signal and/or the on-demand pilot signal may be randomly selected by the user equipment, such as from a pool, and/or may be assigned by the network. In some examples, the mobility tracking reference signal may be transmitted periodically, such as every second, and the on-demand reference signal may be transmitted in response to certain events, such as random access procedure (RACH) events. When new traffic arrives, message exchange resumes, and/or configuration occurs, the user equipment transitions back to RRC_SHORT state 420 as shown by a state transition 470.

Referring back to FIG. 3, the content of pilot signal 300 and/or payload 320 may be dependent on a current state of the user equipment. Using the states of FIG. 4 as representative examples, Table I indicates several different possible candidates for the pilot signal transmitted by the user equipment as part of the serving node selection process.

TABLE I

Exemplary user equipment Chirps

| Pilot Signal Type | User equipment State | Payload 320 | Frequency | Reference Sequence 310 and Resources |
|---|---|---|---|---|
| SIB Request | Any | None | Rare (e.g., twice daily) | Reserved |
| Connection-Setup | RRC_IDLE 410 | Random ID or GUTI | Rare (e.g., power up) | Reserved |
| Mobility Tracking | RRC_LONG 430 | RNTI | Every second or minute | Randomly selected by UE or network-assigned |
| On-Demand | RRC_LONG 430 | RNTI, SR, BSR | Event-driven | Randomly selected by or network-assigned |
| Active Set Tracking | RRC_SHORT 420 | RNTI, CQI, SR, and BSR | Every 10 ms-100 ms | Network-assigned |

Figure 5:
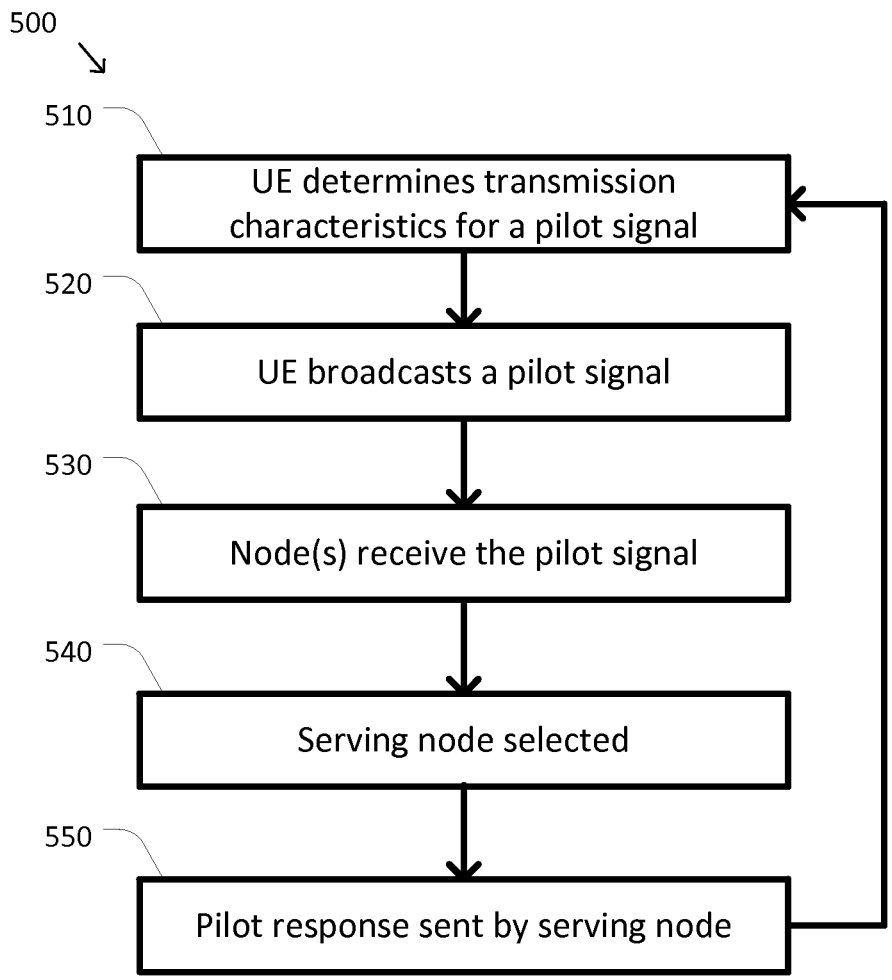
FIG. 5 is a simplified diagram of a method of mobility detection using a distributed allocation approach for transmission characteristics of a pilot signal according to some embodiments.

FIG. 5 is a simplified diagram of a method 500 of mobility detection using a distributed allocation approach for transmission characteristics of a pilot signal according to some embodiments. One or more of the processes 510-550 of method 500 may be implemented, at least in part, in the form of executable code stored on non-transient, tangible, machine readable media that when run by one or more processors (e.g., the one or more processors in control unit 210) may cause the one or more processors to perform one or more of the processes 510-550. In some embodiments, method 500 may be performed by a user equipment (such as user equipment 140), one or more nodes (such as any of nodes 111-117), and/or a zone controller (such as zone controller 130) in order to select a serving node for the user equipment.

At a process 510, the user equipment determines transmission characteristics for a pilot signal. Depending upon the type and/or nature of the mobile network in which method 500 is being performed; a common pool of transmission characteristics including time, frequency, and/or code resources may be set aside to be used for pilot signals, such as pilot signal 300. In some examples, the pool of transmission characteristics may be provided to the user equipment by the mobile network. In some examples, the pool of transmission characteristics may be designated based on a type of multiplexing used by the mobile network and/or the utilization of time, frequency, and/or code resources for other management and data communications within the mobile network. In some examples, a size of the pool of transmission characteristics used may be managed to facilitate a tradeoff between an amount of bandwidth dedicated to pilot signals and the likelihood of collisions between pilot signals of two or more user equipment that have selected the same time, frequency, and/or code resource from the pool of transmission characteristics. In some examples, giving the user equipment control over the selection of time resources better accommodates the ability of the user equipment to schedule pilot signals around other communication tasks of the user equipment and/or utilization of the communications channels by the user equipment. In some examples, the user equipment may select randomly from the pool and/or using some other suitable approach.

At a process 520, the user equipment broadcasts the pilot signal using the pilot signal characteristics determined during process 510. In some examples, the user equipment may use a CODEC and/or other device to format and transmit the pilot signal using an antenna, such as antenna 240. In some examples, the pilot signal may include a reference sequence and/or a payload that depends on the state of the user equipment as described previously with respect to FIG. 3.

At a process 530, one or more nodes receive the pilot signal. Depending upon which nodes of the mobile network are within communications range of the user equipment, one or more nodes receive the pilot signal transmitted by the user equipment during process 520. In some examples, the one or more nodes may each receive the pilot signal on a respective antenna, such as antenna 240 and/or use a CODEC or other device to decode the pilot signal. Each of the nodes which is able to receive and/or decode the pilot signal become a member of an active set of nodes.

At a process 540, a serving node is selected. Using the active set of nodes determined during process 530, a serving node for the user equipment that broadcasted the pilot signal during process 520 is selected. In some examples, the serving node may be selected in a distributed fashion by the nodes in the active set or by a zone controller, such as zone controller 130, as described above with respect to FIG. 1. In some examples, any of one or more factors including geographic location, signal strength, load balancing, and/or the like may be used to select the serving node as described above with respect to FIG. 1.

At a process 550, a pilot response is sent by the serving node selected during process 550. By sending a pilot response to the user equipment, the serving node advertises its presence to the user equipment and the serving node then becomes the primary point of communication between the user equipment and the mobile network. In some examples, the pilot response may be transmitted to the user equipment based on information included in the pilot signal received during process 530.

After completion of process 550, the user equipment is able to more fully communicate with the mobile network through the serving node. Method 500 is repeated at intervals to continuously track the user equipment and allow for the assignment of an appropriate serving node for the user equipment as the user equipment moves about the mobile network, and/or conditions change within the mobile network. In some examples, the intervals may be consistent with the intervals of Table I. As shown in FIG. 5, each time a new pilot signal is broadcast, new transmission characteristics for the pilot signal are determined, although in some embodiments, process 510 may be skipped for subsequent pilot signals. In some examples, when a collision occurs between pilot signals by two or more different user equipment, process 510 may be repeated by each of the user equipment to select new transmission characteristics for their respective next pilot signals. In some examples, each of the user equipment involved in the collision may use one or more back-off procedures, such as those used by Aloha, CSMA, and/or other collision management protocols before broadcasting the next pilot signal.

Figure 6:
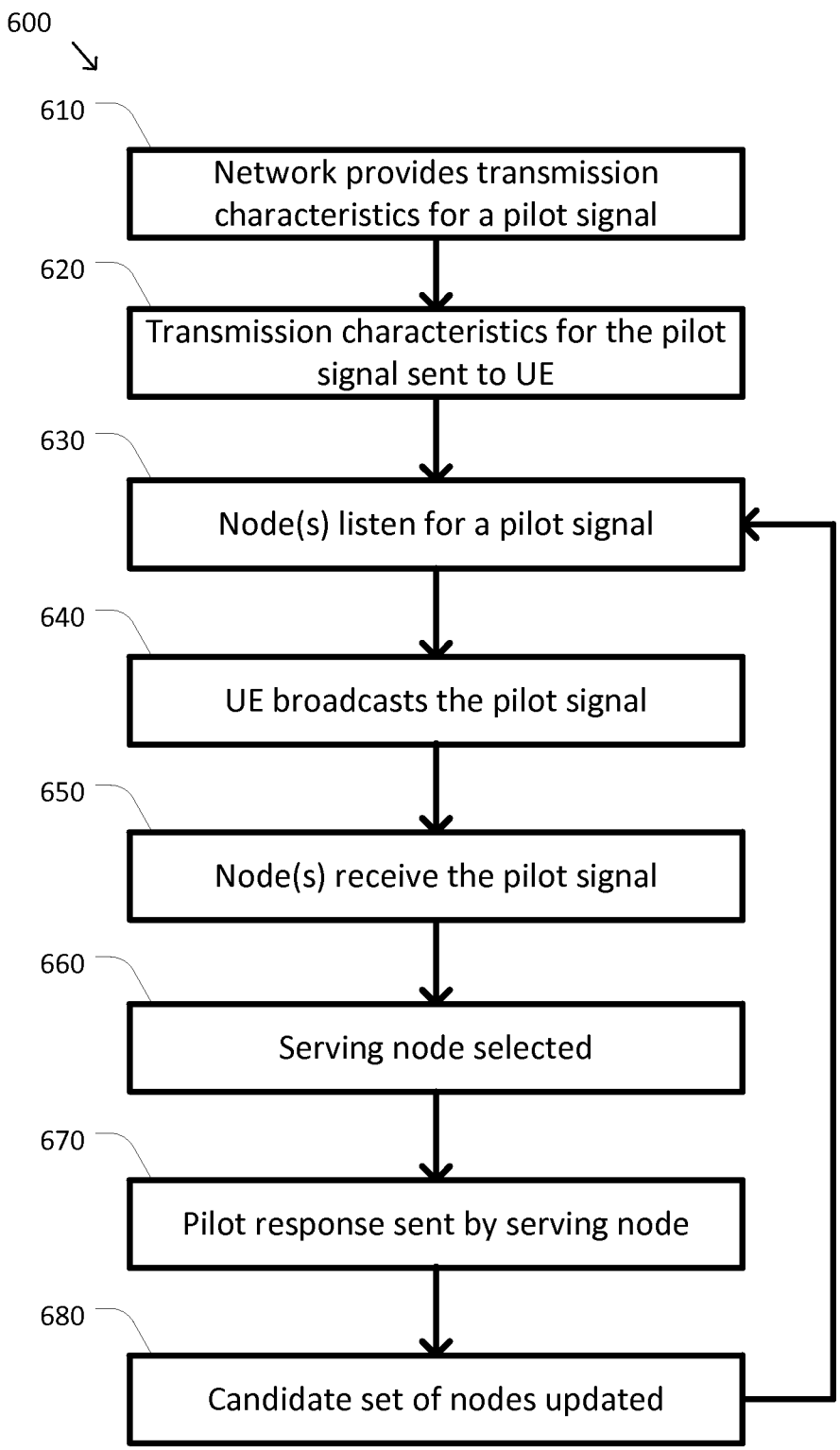
FIG. 6 is a simplified diagram of a method of mobility detection using network distributed transmission characteristics for a pilot signal according to some embodiments.

FIG. 6 is a simplified diagram of a method 600 of mobility detection using network distributed transmission characteristics for a pilot signal according to some embodiments. One or more of the processes 610-680 of method 600 may be implemented, at least in part, in the form of executable code stored on non-transient, tangible, machine readable media that when run by one or more processors (e.g., the one or more processors in control unit 210) may cause the one or more processors to perform one or more of the processes 610-680. In some embodiments, method 600 may be performed by a user equipment (such as user equipment 140), one or more nodes (such as any of nodes 111-117), and/or a zone controller (such as zone controller 130) in order to select a serving node for the user equipment.

At a process 610, the network provides transmission characteristics for a pilot signal to the user equipment. Depending upon the type and/or nature of the mobile network in which method 600 is being performed; the transmission characteristics of the pilot signal provided to each user equipment may be selected from a common pool of transmission characteristics, including time, frequency, and/or code resources, by a zone controller, such as zone controller 130. In some examples, the pool of transmission characteristics may be designated based on a type of multiplexing used by the mobile network and/or the utilization of time, frequency, and/or code resources for other management and data communications within the mobile network. In some examples, a size of the pool of transmission characteristics used may be managed to facilitate a tradeoff between an amount of bandwidth dedicated to pilot signals and the expected number of user equipment that may be simultaneously supported by method 600.

At a process 620, the transmission characteristics for the pilot signal are sent to the user equipment. As part of the connection set-up between the user equipment and the mobile network, the transmission characteristics for the pilot signal assigned to the user equipment during process 610 may be sent to the user equipment.

At a process 630, the nodes listen for a pilot signal with the transmission characteristics for the pilot signal. In some examples, to reduce a burden on the nodes of the mobile network due to having to monitor for pilot signals for each of the possible combinations of characteristics in the pool of transmission characteristics, just the nodes in the candidate set of nodes listen for pilot signals having the assigned pilot signal characteristics. In some examples, the candidate set of nodes may be restricted to nodes most likely to be able to receive and/or decode the pilot signal.

At a process 640, the user equipment broadcasts the pilot signal using the transmission characteristics received during process 640. In some examples, the user equipment may use a CODEC and/or other device to format and transmit the pilot signal using an antenna, such as antenna 240.

At a process 650, an active set of nodes receive the pilot signal. Depending upon which nodes of the mobile network are within communications range of the user equipment, one or more nodes receive the pilot signal transmitted by the user equipment during process 640 and become members of the active set of nodes. In some examples, the one or more nodes may each receive the pilot signal on a respective antenna, such as antenna 240 and/or use a CODEC or other device to decode the pilot signal. Each of the nodes which is able to receive and/or decode the pilot signal become a member of an active set of nodes.

At a process 660, a serving node is selected. Using the active set of nodes determined during process 650, a serving node for the user equipment that broadcasted the pilot signal during process 640 is selected. In some examples, the serving node may be selected in a distributed fashion by the nodes in the active set or by a zone controller, such as zone controller 130, as described above with respect to FIG. 1. In some examples, any of one or more factors including geographic location, signal strength, load balancing, and/or the like may be used to select the serving node as described above with respect to FIG. 1.

At a process 670, a pilot response is sent by the serving node selected during process 660. By sending a pilot response to the user equipment, the serving node advertises its presence to the user equipment and the serving node then becomes the primary point of communication between the user equipment and the mobile network. In some examples, the pilot response may be transmitted to the user equipment based on information included in the pilot signal received during process 650.

At a process 680, the candidate set of nodes is updated. In some examples, the candidate set of nodes may be selected as the serving node and each of the nodes that are adjacent neighbors (e.g., geographically) to the serving node in the mobile network. In some examples, the candidate set of nodes may further include nodes that are adjacent neighbors (i.e., neighbors of distance 2) to the adjacent neighbors of the serving node. In some examples, the candidate set of nodes may be selected to include the active set of nodes as well as to optionally include neighbors of any reasonable distance to the nodes in the active set of nodes. In some examples, a projected direction of movement of the user equipment may be used to add additional nodes to the candidate set of nodes. In some examples, a trade-off between a size of the candidate set and a likelihood of a fast rate of mobility for the user equipment may be considered in determining whether to include nodes that are adjacent to the serving node at a distance of 1, 2, and/or larger.

After completion of process 680, processes 630-680 may be repeated at intervals to continuously track the user equipment and allow for the assignment of an appropriate serving node for the user equipment as the user equipment moves about the mobile network, and/or conditions change within the mobile network. In some examples, the intervals may be consistent with the intervals of Table I. In some examples, method 600 may repeat processes 610 and 620 at less frequent intervals and/or whenever the serving node for the user equipment changes.

As discussed above and further emphasized here, FIG. 6 is merely an example which should not unduly limit the scope of the claims. One of ordinary skill in the art would recognize many variations, alternatives, and modifications. According to some embodiments, each of the nodes in the zone and/or the mobile network may listen for the pilot signal without restricting the listening to the candidate set during process 630. When this approach is used, process 680 is optional and may be omitted.

Some examples of network devices, such as nodes 111-117, zone controller 130, user equipment 140, and/or network device 200 may include non-transient, tangible, machine readable media that include executable code that when run by one or more processors (e.g., the one or more processors of control unit 210) may cause the one or more processors to perform the processes of methods 500 and/or 600. Some common forms of machine readable media that may include the processes of methods 500 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications.

What is claimed is:

1. A user equipment comprising:
an antenna for receiving and sending signals to a plurality of network nodes in a network; and
a processor coupled to the antenna;
wherein the processor is configured to:
select transmission resources for a pilot signal from a pool of transmission resources during at least one state of operation of the user equipment where data is not actively transferred between the user equipment and a serving node;
broadcast, using the antenna and the selected transmission resources, the pilot signal to the plurality of network nodes at intervals that depend on a state of the user equipment, the pilot signal advertising the user equipment to the plurality of network nodes;
receive, using the antenna, a pilot response from a first network node in response to the first network node receiving the broadcast pilot signal, the pilot response reporting to the user equipment selection of the first network node as the serving node for the user equipment; and
communicate with the network through the serving node;
wherein:
the pilot signal includes a reference sequence followed by a payload including information about an identity of the user equipment, the reference sequence comprising a signaling pattern to support recognition of the pilot signal as a pilot signal by the plurality of network nodes and tracking of the pilot signal by the plurality of network nodes; and
a type of the pilot signal varies based on a state of the user equipment.

2. The user equipment of claim 1, wherein the at least one state of operation is an RRC_LONG state.

3. The user equipment of claim 1, wherein the payload of the pilot signal includes information regarding a channel state measured from a last transmission sent by the network to the user equipment.

4. The user equipment of claim 1, wherein the payload of the pilot signal includes information regarding a transmit buffer state of the user equipment.

5. The user equipment of claim 1, wherein the reference sequence varies based on a state of the user equipment.

6. The user equipment of claim 5, wherein the processor is further configured to randomly select the reference sequence during at least one state of operation of the user equipment.

7. A network node for coupling a plurality of user equipment to a network, the network node comprising:
an antenna for receiving and sending signals to the plurality of user equipment; and
a processor coupled to the antenna;
wherein the processor is configured to:
receive, using the antenna, a pilot signal broadcast by a first user equipment to the network node and other network nodes coupled to the network node, the pilot signal being broadcast at intervals that depend on a state of the first user equipment and the pilot signal being broadcast using transmission resources selected from a pool of transmission resources by the first user equipment in at least one state of operation that depends on a state of the first user equipment where data is not actively transferred between the user equipment and a serving node;
exchange information about the pilot signal with the other network nodes;
elect or not elect the network node as the serving node for the first user equipment based on the exchanged information about the pilot signal; and
transmit, using the antenna, a pilot response to the first user equipment when the network node is elected as the serving node for the first user equipment;
wherein:
the pilot signal includes a reference sequence followed by a payload including information about an identity of the first user equipment, the reference sequence comprising a signaling pattern to support recognition of the pilot signal as a pilot signal by the network node and the other network nodes and tracking of the pilot signal by the network node and the other network nodes; and
a type of the pilot signal varies based on a state of the first user equipment.

8. The network node of claim 7, wherein the network node and the other network nodes are part of a zone.

9. The network node of claim 7, wherein the processor is further configured to transmit the pool of transmission resources to the first user equipment.

10. The network node of claim 7, wherein the transmission resources used to broadcast the pilot signal include one or more resources selected from a group consisting of time, frequency, and code resources.

11. The network node of claim 7, wherein the information about the pilot signal includes a signal strength of the pilot signal.

12. The network node of claim 7, wherein the payload of the pilot signal includes information regarding a transmit buffer state of the first user equipment.

13. The network node of claim 7, wherein the reference sequence varies based on a state of the first user equipment.

14. The network node of claim 7, wherein the reference sequence is randomly selected by the first user equipment during at least one state of operation of the first user equipment.

15. The network node of claim 7, wherein the processor is further configured to:
exchange network load information with the other network nodes; and
further elect or not elect the network node as the serving node for the first user equipment based on the exchanged network load information.

16. The network node of claim 7, wherein the processor is further configured to:
periodically receive, using the antenna, additional pilot signals broadcast by the first user equipment at intervals based on the state of the first user equipment;
exchange information about the additional pilot signals with the other network nodes;
revisit the electing or not electing of the network node as the serving node for the first user equipment based on the exchanged information about the additional pilot signals with each additional pilot signal received; and
transmit, using the antenna, a second pilot response to the first user equipment when the network node continues to be elected as the serving node for the first user equipment.

17. A semiconductor device, the device comprising:
a memory; and
one or more processors coupled to the memory and configured to read instructions from the memory to cause the device to perform operations comprising:
selecting transmission resources for a pilot signal from a pool of transmission resources during at least one state of operation of a user equipment where data is not actively transferred between the user equipment and a serving node;
broadcasting, using an antenna of the user equipment and the selected transmission resources, the pilot signal to a plurality of network nodes of a network to advertise the user equipment to the plurality of network nodes at intervals that depend on a state of the user equipment;
receiving, using the antenna, a pilot response from a first network node in response to the first network node receiving the broadcast pilot signal, the pilot response reporting to the user equipment selection of the first network node as the serving node for the user equipment; and
sending and receiving messages through the antenna to the serving node;
wherein:
the pilot signal includes a reference sequence followed by a payload including information about an identity of the user equipment, the reference sequence comprising a signaling pattern to support recognition of the pilot signal as a pilot signal by the plurality of network nodes and tracking of the pilot signal by the plurality of network nodes; and
a type of the pilot signal varies based on a state of the user equipment.

18. The device of claim 17, wherein the at least one state of operation is an RRC_LONG state.

19. The device of claim 17, wherein the payload of the pilot signal includes information regarding a channel state measured from a last transmission sent by the network to the user equipment.

20. The device of claim 17, wherein the payload of the pilot signal includes information regarding a transmit buffer state of the user equipment.

21. The device of claim 17, wherein the reference sequence varies based on a state of the user equipment.

22. The device of claim 21, wherein the operations further comprise randomly selecting the reference sequence during at least one state of operation of the user equipment.

23. A method comprising:
selecting, by a processor of a user equipment, transmission resources for a pilot signal from a pool of transmission resources during at least one state of operation of the user equipment where data is not actively transferred between the user equipment and a serving node;
broadcasting, by the user equipment using an antenna and the selected transmission resources, the pilot signal to a plurality of network nodes in a network to advertise the user equipment to the plurality of network nodes at intervals that depend on a state of the user equipment, the antenna being coupled to the processor;
receiving, by the user equipment using the antenna, a pilot response from a first network node in response to the first network node receiving the broadcast pilot signal, the pilot response reporting to the user equipment selection of the first network node as the serving node for the user equipment; and
communicating, by the user equipment, with the network through the serving node;
wherein:
the pilot signal includes a reference sequence followed by a payload including information about an identity of the user equipment, the reference sequence comprising a signaling pattern to support recognition of the pilot signal as a pilot signal by the plurality of network nodes and tracking of the pilot signal by the plurality of network nodes; and
a type of the pilot signal varies based on a state of the user equipment.

24. The method of claim 23, wherein the payload of the pilot signal includes information regarding a channel state measured from a last transmission sent by the network to the user equipment, information regarding a transmit buffer state of the user equipment, or both.

25. The method of claim 23, wherein the reference sequence varies based on a state of the user equipment.

26. The method of claim 25, further comprising randomly selecting the reference sequence during at least one state of operation of the user equipment.

27. A user equipment comprising:
means for selecting transmission resources for a pilot signal from a pool of transmission resources during at least one state of operation of the user equipment where data is not actively transferred between the user equipment and a serving node;
means for broadcasting the pilot signal, using the selected transmission resources, to a plurality of network nodes in a network to advertise the user equipment to the plurality of network nodes at intervals that depend on a state of the user equipment;
means for receiving a pilot response from a first network node in response to the first network node receiving the broadcast pilot signal, the pilot response reporting to the user equipment selection of the first network node as the serving node for the user equipment; and
means for communicating with the network through the serving node;
wherein:
the pilot signal includes a reference sequence followed by a payload including information about an identity of the user equipment, the reference sequence comprising a signaling pattern to support recognition of the pilot signal as a pilot signal by the plurality of network nodes and tracking of the pilot signal by the plurality of network nodes; and
a type of the pilot signal varies based on a state of the user equipment.

28. The user equipment of claim 27, wherein the payload of the pilot signal includes information regarding a channel state measured from a last transmission sent by the network to the user equipment, information regarding a transmit buffer state of the user equipment, or both.

29. The user equipment of claim 27, wherein the reference sequence varies based on a state of the user equipment.

30. The user equipment of claim 29, further comprising means for randomly selecting the reference sequence during at least one state of operation of the user equipment.

31. A method comprising:
receiving, using an antenna at a network node, a pilot signal broadcast by a user equipment to the network node and other network nodes coupled to the network node, the pilot signal being broadcast at intervals that depend on a state of the user equipment and the pilot signal being broadcast using transmission resources selected from a pool of transmission resources by the user equipment in at least one state of operation that depends on a state of the user equipment where data is not actively transferred between the user equipment and a serving node;
exchanging information about the pilot signal with the other network nodes
electing or not electing, using a processor coupled to the antenna, the network node as the serving node for the user equipment based on the exchanged information about the pilot signal; and
transmitting, using the antenna, a pilot response to the user equipment when the network node is elected as the serving node for the user equipment;
wherein:
the pilot signal includes a reference sequence followed by a payload including information about an identity of the user equipment, the reference sequence comprising a signaling pattern to support recognition of the pilot signal as a pilot signal by the network node and the other network nodes and tracking of the pilot signal by the network node and the other network nodes; and
a type of the pilot signal varies based on a state of the user equipment.

32. The method of claim 31, further comprising transmitting the pool of transmission resources to the user equipment.

33. The method of claim 31, wherein the information about the pilot signal includes a signal strength of the pilot signal.

34. The method of claim 31, wherein the reference sequence varies based on a state of the user equipment.

35. The method of claim 31, wherein the reference sequence is randomly selected by the user equipment during at least one state of operation of the user equipment.

36. The method of claim 31, further comprising:
exchanging network load information with the other network nodes; and
further electing or not electing the network node as the serving node for the user equipment based on the exchanged network load information.

37. A network node comprising:
means for receiving a pilot signal broadcast by a user equipment to the network node and other network nodes coupled to the network node, the pilot signal being broadcast at intervals that depend on a state of the user equipment and the pilot signal being broadcast using transmission resources selected from a pool of transmission resources by the user equipment in at least one state of operation that depends on a state of the user equipment where data is not actively transferred between the user equipment and a serving node;
means for exchanging information about the pilot signal with the other network nodes;
means for electing or not electing the network node as the serving node for the user equipment based on the exchanged information about the pilot signal; and
means for transmitting a pilot response to the user equipment when the network node is elected as the serving node for the user equipment;
wherein:
the pilot signal includes a reference sequence followed by a payload including information about an identity of the user equipment, the reference sequence comprising a signaling pattern to support recognition of the pilot signal as a pilot signal by the network node and the other network nodes and tracking of the pilot signal by the network node and the other network nodes; and
a type of the pilot signal varies based on a state of the user equipment.

38. The network node of claim 37, further comprising means for transmitting the pool of transmission resources to the user equipment.

39. The network node of claim 37, wherein the information about the pilot signal includes a signal strength of the pilot signal.

40. The network node of claim 37, wherein the reference sequence is randomly selected by the user equipment during at least one state of operation of the user equipment.

41. The network node of claim 37, further comprising:
means for exchanging network load information with the other network nodes; and
means for further electing or not electing the network node as the serving node for the user equipment based on the exchanged network load information.

42. A wireless communication system for accessing a network, the system comprising:
a user equipment comprising a first antenna for receiving and sending signals and a first processor coupled to the first antenna;
a plurality of network nodes, each of the network nodes comprising a second antenna for sending and receiving signals and a second processor coupled to the second antenna;
wherein the user equipment is configured to:
select transmission resources for a pilot signal from a pool of transmission resources during at least one state of operation of the user equipment where data is not actively transferred between the user equipment and a serving node;

broadcast, using the first antenna and the selected transmission resources, the pilot signal to the plurality of network nodes, the pilot signal advertising the user equipment to the plurality of network nodes at intervals that depend on a state of the user equipment;

receive, using the first antenna, a pilot response from a first network node from the plurality of network nodes; and communicate with the network through the first network node;

wherein the each of the network nodes is configured to:
receive, using the second antenna, the pilot signal broadcast by the user equipment;

exchange information about the pilot signal with others of the plurality of network nodes; and elect or not elect the first network node as a serving node for the user equipment based on the exchanged information about the pilot signal;

wherein the first network node is further configured to:
transmit the pilot response to the user equipment in response to being elected as the serving node for the user equipment;

wherein:
the pilot signal includes a reference sequence followed by a payload including information about an identity of the user equipment, the reference sequence comprising a signaling pattern to support recognition of the pilot signal as a pilot signal by the plurality of network nodes and tracking of the pilot signal by the plurality of network nodes; and a type of the pilot signal varies based on a state of the user equipment.

43. The system of claim 42, wherein the plurality of network nodes are part of a zone.

44. The system of claim 43, wherein the selected transmission resources include one or more resources selected from a group consisting of time, frequency, and code resources.

45. The system of claim 42, wherein the information about the pilot signal includes a signal strength of the pilot signal, a transmit buffer state of the user equipment, or both.

46. The system of claim 42, wherein each of the network nodes is further configured to:

exchange network load information with other network nodes; and further elect or not elect the first network node as the serving node for the user equipment based on the exchanged network load information.

47. The system of claim 42, wherein the first network node is further configured to:

periodically receive additional pilot signals broadcast by the user equipment to the plurality of network nodes at intervals based on the state of the user equipment;

exchange information about the additional pilot signals with the others of the plurality of network nodes;

revisit the electing or not electing of the first network node as the serving node for the user equipment based on the exchanged information about the additional pilot signals with each additional pilot signal received; and transmit a second pilot response to the user equipment when the first network node continues to be elected as the serving node for the user equipment.

* * * * *